(12) United States Patent
Lin et al.

(10) Patent No.: US 8,045,036 B2
(45) Date of Patent: Oct. 25, 2011

(54) APPARATUS AND METHOD FOR SORTING RAW DATA WITH HORIZONTAL DIVISION

(75) Inventors: Chia-Ho Lin, Hsinchu County (TW); Bo-Wen Li, Taipei County (TW)

(73) Assignee: Novatek Microelectronics Corp., Hsinchu (TW)

( * ) Notice: Subject to any disclaimer, the term of this patent is extended or adjusted under 35 U.S.C. 154(b) by 807 days.

(21) Appl. No.: 11/962,117

(22) Filed: Dec. 21, 2007

(65) Prior Publication Data

US 2009/0112866 A1 Apr. 30, 2009

(30) Foreign Application Priority Data

Oct. 24, 2007 (TW) .............................. 96139843 A

(51) Int. Cl.
*H04N 3/14* (2006.01)
*H04N 5/335* (2006.01)
*H04N 5/228* (2006.01)

(52) U.S. Cl. ..................................... 348/317; 348/222.1

(58) Field of Classification Search .................. 348/311, 348/317, 571, 584, 714, 715
See application file for complete search history.

(56) References Cited

U.S. PATENT DOCUMENTS

| 6,538,696 B2 * | 3/2003 | Hieda et al. .................. 348/317 |
| 2009/0066812 A1 * | 3/2009 | Nakaya et al. ........... 348/231.99 |

* cited by examiner

*Primary Examiner* — Kelly L Jerabek
(74) *Attorney, Agent, or Firm* — Jianq Chyun IP Office

(57) ABSTRACT

An apparatus for sorting a raw data with horizontal division is provided. The apparatus includes a frame memory and a frame data sorting device coupled to the frame memory. The frame memory stores a frame data having m vertical fields, and each of the vertical fields has n horizontal fields. The frame data sorting device sorts at least one first data block having Vstripe rows of the frame data according to the value n to generate a sorted first data block and overwrites the first data block with the sorted first data block. The frame data sorting device also sorts at least one second data block having Hstripe columns of the frame data according to the value m to generate a sorted second data block and overwrites the second data block with the sorted second data block.

11 Claims, 12 Drawing Sheets

APPARATUS AND METHOD FOR SORTING RAW DATA WITH HORIZONTAL DIVISION

CROSS-REFERENCE TO RELATED APPLICATION

This application claims the priority benefit of Taiwan application serial no. 96139843, filed on Oct. 24, 2007. The entirety of the above-mentioned patent application is hereby incorporated by reference herein and made a part of this specification.

BACKGROUND OF THE INVENTION

1. Field of the Invention

The present invention generally relates to an apparatus and a method for sorting data, in particular, to an apparatus and a method for sorting a raw data with horizontal division.

2. Description of Related Art

Along with the advancement of semiconductor and photo-electricity technologies, digital cameras, digital monitors, and digital video cameras have been broadly applied in our daily lives. In a photographic apparatus (for example, a digital camera, a digital monitor, or a digital video camera), a photosensitive device is used for converting an optical signal into an electrical signal. The photosensitive device is usually a charge coupled device (CCD) or a complementary metal-oxide semiconductor (CMOS) image sensor, wherein a CCD offers better image quality than a CMOS image sensor.

FIG. 1 illustrates a format of an image data produced by a conventional CCD. As shown in FIG. 1, the image data 10 produced by the CCD has five vertical fields Field 1~Field 5. Assuming that the image data 10 contains 45×60 pixels, each of the vertical fields Field 1~Field 5 has 9 rows of data, and the each row of data has 60 pixels. After the CCD renders the image, the vertical field Field i has the data of the $(5*k+i)^{th}$ row, wherein k is an integer of 0 to (45/5−1)=8, and i is an integer of 1 to 5.

However, foregoing image data cannot be displayed in foregoing format, and accordingly, the image data has to be sorted before it can be displayed, wherein the sorting process can be implemented with software or hardware.

FIG. 2 illustrates the sorting mechanism of an image data 20 produced by a conventional CCD. The image data 20 stored in a frame memory has five vertical fields Field 1~Field 5. During the first sorting run, the data block 201 of the first Hstripe columns is read, and a row sorting is then performed to the data block 201 according to the number of the vertical fields (there are five vertical fields in the present embodiment), and the originally-read data block 201 is then overwritten by the sorted data block 211. During the next run, data block 202 is read, and a row sorting is performed thereto, and then the originally-read data block 202 is overwritten by the sorted data block. This process goes on until the sorting of the entire image data 20 is completed, so that the sorted image data can be displayed in a display apparatus.

An example will be described herein. Here it is assumed that the image data 20 contains 45×60 pixels, the value of Hstripe is 20, each of the vertical fields Field 1~Field 5 has 9 rows of data, and each row of data has 60 pixels. After the CCD renders the image, the vertical field Field i has the data of the $(5*k+i)^{th}$ row, wherein k is an integer of 0 to 8, and i is an integer of 1 to 5. According to the conventional sorting method, the data block of the first 20 columns is first read. Then, a row sorting is performed to the data block of the first 20 columns according to the number of the vertical fields, so that the vertical field Field 1 has the data of rows 1~9, the vertical field Field 2 has the data of rows 10~18, the vertical field Field 3 has the data of rows 19~27, the vertical field Field 4 has the data of rows 28~36, and the vertical field Field 5 has the data of rows 37~45, wherein each row of data contains pixels 1~20. After that, the originally-read data block of the first 20 columns is overwritten by the sorted data block of the first 20 columns.

Thereafter, the data block of columns 21~40 is read, and a row sorting is performed to the data block of columns 21~40 according to the number of the vertical fields, so that the vertical field Field 1 has the data of rows 1~9, the vertical field Field 2 has the data of rows 10~18, the vertical field Field 3 has the data of rows 19~27, the vertical field Field 4 has the data of rows 28~36, and the vertical field Field 5 has the data of rows 37~45, wherein each row of data contains pixels 21~40. After that, the originally-read data block of columns 21~40 is overwritten by the sorted data block of columns 21~40.

Finally, the data block of columns 41~60 is read, and a row sorting is performed to the data block of columns 41~60 according to the number of the vertical fields, so that the vertical field Field 1 has the data of rows 1~9, the vertical field Field 2 has the data of rows 10~18, the vertical field Field 3 has the data of rows 19~27, the vertical field Field 4 has the data of rows 28~36, and the vertical field Field 5 has the data of rows 37~45, wherein each row of data contains pixels 41~60. After that, the originally-read data block of columns 41~60 is overwritten by the sorted data block of columns 41~60. By now, the sorting of the entire image data is completed.

However, in order to obtain a better image quality, another format of image data produced by CCD is provided. FIG. 3 illustrates the other format of image data produced by a conventional CCD. Referring to FIG. 3, the image data 30 includes 5 vertical fields, wherein the first vertical field further includes 3 horizontal fields Field 1-1, Field 1-2, and Field 1-3, the second vertical field further includes 3 horizontal fields Field 2-1, Field 2-2, and Field 2-3, and so on. Assuming that the image data contains 45×60 pixels, the $i^{th}$ vertical field has the data of the $(5*k+i)^{th}$ row, wherein k is an integer of 0 to 8, and i is an integer of 1 to 5; and the data of the $n^{th}$ horizontal field Field i-n in the $i^{th}$ vertical field has the $(n+3*m)^{th}$ pixel in the $(5*k+i)^{th}$ row, wherein n is an integer of 1 to 3, and m is an integer of 0 to (60/3−1)=19.

The image data 30 cannot be sorted into a format acceptable a display apparatus in the same way as illustrated in FIG. 2. However, this purpose can be accomplished through software and the calculations of a central processing unit (CPU).

FIG. 4 illustrates a method for sorting the image data 30 with horizontal division through CPU calculations and the timing thereof. In this method, horizontal fields Field i-1~Field i-3 of the image data 30 are read every time when a vertical synchronous signal VD drops from a high level to a low level, wherein i is an integer of 1 to 5. After the entire image data 30 has been read, the CPU sorts the image data 30 into a format which can be displayed in a display apparatus according to a sorting algorithm.

However, in the method described above, it takes 5 cycles of the vertical synchronous signal VD to read the image data 30 and a long execution time Tcpu for the CPU to sort the entire image data 30 into aforementioned format. Besides, a large memory space is required for storing the entire image data, and such a large memory space increases the area of the hardware. Accordingly, long calculation time and large memory space are required in order to sort the image data 30 with horizontal division as illustrated in FIG. 3 into a format acceptable to a display apparatus.

In order to resolve foregoing problems, the present invention provides an apparatus and a method for sorting an image data with horizontal division into a format acceptable to a display apparatus by revising existing hardware structure, wherein both the calculation time and memory space required for sorting the image data are reduced.

SUMMARY OF THE INVENTION

Accordingly, the present invention is directed to a method for sorting a raw data with horizontal division, and an apparatus applying this method can sort the raw data by using less time and memory space compared to the conventional technique.

The present invention provides an apparatus for sorting a raw data with horizontal division. The apparatus includes a frame memory and a frame data sorting device coupled to the frame memory. The frame memory stores a frame data having m vertical fields, wherein each of the vertical fields has n horizontal fields. The frame data sorting device sorts at least one first data block having Vstripe rows of the frame data according to the value n to generate a sorted first data block and overwrites the first data block with the sorted first data block. The frame data sorting device sorts at least one second data block having Hstripe columns of the frame data according to the value m to generate a sorted second data block and overwrites the second data block with the sorted second data block.

According to an embodiment of the present invention, the frame data sorting device includes a first sorting device and a second sorting device. The first sorting device reads the first data block from the frame memory, sorts the first data block according to the value n, and sends the sorted first data block to the frame memory for overwriting the first data block. The second sorting device reads the second data block from the frame memory, sorts the second data block according to the value m, and sends the sorted second data block to the frame memory for overwriting the second data block.

According to an embodiment of the present invention, the first sorting device includes a first rotating device, a row sorting device, and a second rotating device. The row sorting device is coupled to the first rotating device, and the second rotating device is coupled to the row sorting device. The first rotating device reads the first data block and rotates the first data block 90° to generate a rotated first data block. The row sorting device performs a row sorting to the rotated first data block according to the value n to generate a rotated and sorted first data block. The second rotating device rotates the rotated and sorted first data block 90° to generate the sorted first data block and sends the rotated, sorted, and rotated first data block to the frame memory for overwriting the first data block.

The present invention provides a method for sorting a raw data with horizontal division. The method includes: (1) reading a first data block having Vstripe rows of a frame data, wherein the frame data has m vertical fields, and each of the vertical fields has n horizontal fields; (2) sorting the first data block according to the value n to generate a sorted first data block; (3) overwriting the first data block in the frame data with the sorted first data block; (4) reading a second data block having Hstripe columns of the frame data; (5) sorting the second data block according to the value m to generate a second sorted data block; (6) overwriting the second data block in the frame data with the sorted second data block.

According to an embodiment of the present invention, the step of sorting the first data block according to the value n further includes: (a) rotating the first data block to generate a rotated first data block, wherein the first data block is rotated 90°; (b) performing a row sorting to the rotated first data block according to the value n to generate a rotated and sorted first data block; (c) rotating the rotated and sorted first data block to generate the sorted first data block, wherein the sorted first data block is rotated 90°.

According to an embodiment of the present invention, in foregoing sorting method, the second data block is read and sorted only after each row of the frame data has been sorted and overwritten, or the first data block is read and sorted only after each column of the frame data has been sorted and overwritten.

The present invention provides an apparatus and a method for sorting a raw data with horizontal division by revising the existing hardware structure, and compared to the conventional technique, the sorting apparatus and method in the present invention take less time to sort the raw data. Moreover, some hardware devices in the sorting apparatus provided by the present invention can be combined by adopting a control signal so that the space taken by the hardware can be reduced. Furthermore, the values of foregoing Vstripe and Hstripe can be determined according to the size of the buffer memory, and within an acceptable range of processing time, Vstripe and Hstripe can be set to lower values so as to save the memory space.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
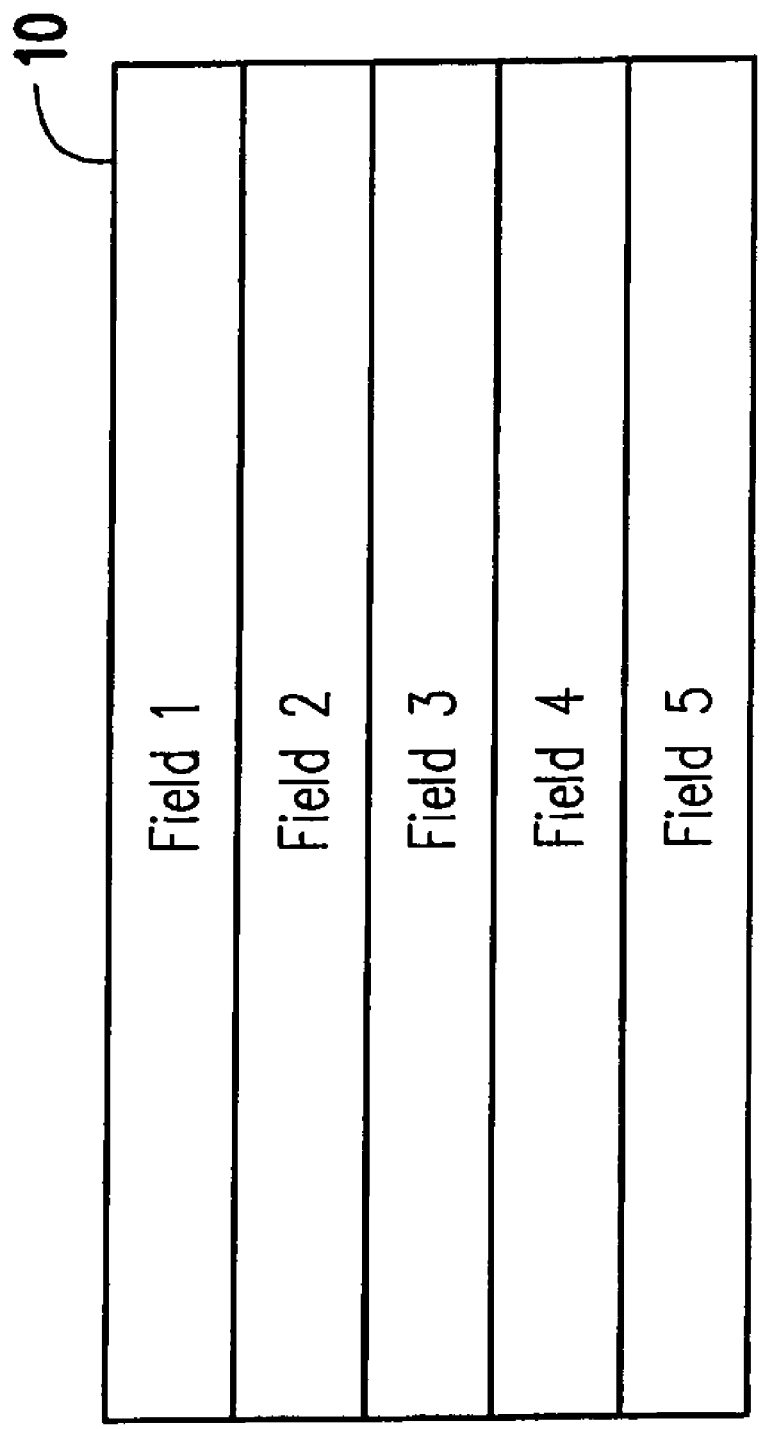
FIG. 1 illustrates a format of image data produced by a conventional charge coupled device (CCD).
Figure 2:
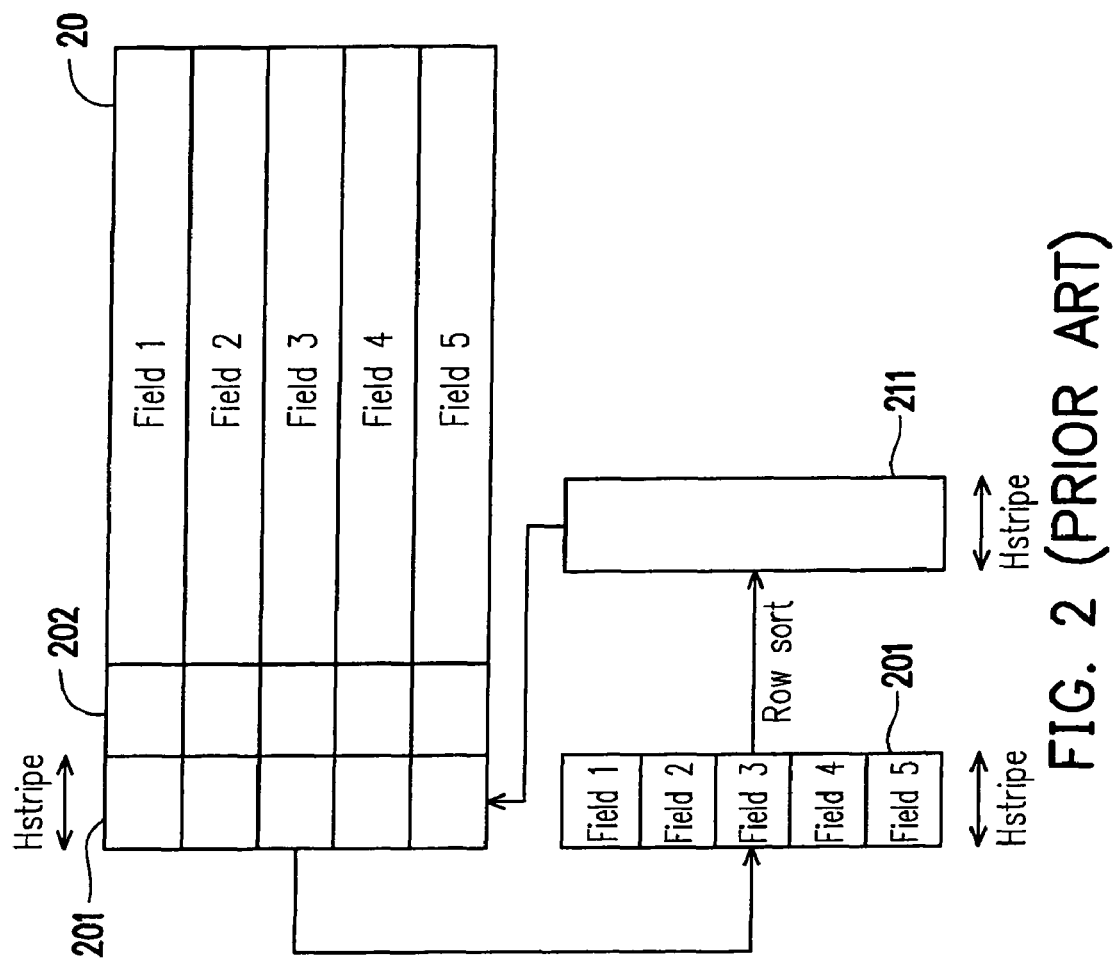
FIG. 2 illustrates the sorting mechanism of an image data 20 produced by a conventional CCD.
Figure 3:
FIG. 3 illustrates another format of image data produced by a conventional CCD.

Reference will now be made in detail to the present preferred embodiments of the invention, examples of which are illustrated in the accompanying drawings. Wherever possible, the same reference numbers are used in the drawings and the description to refer to the same or like parts.

Figure 5A:
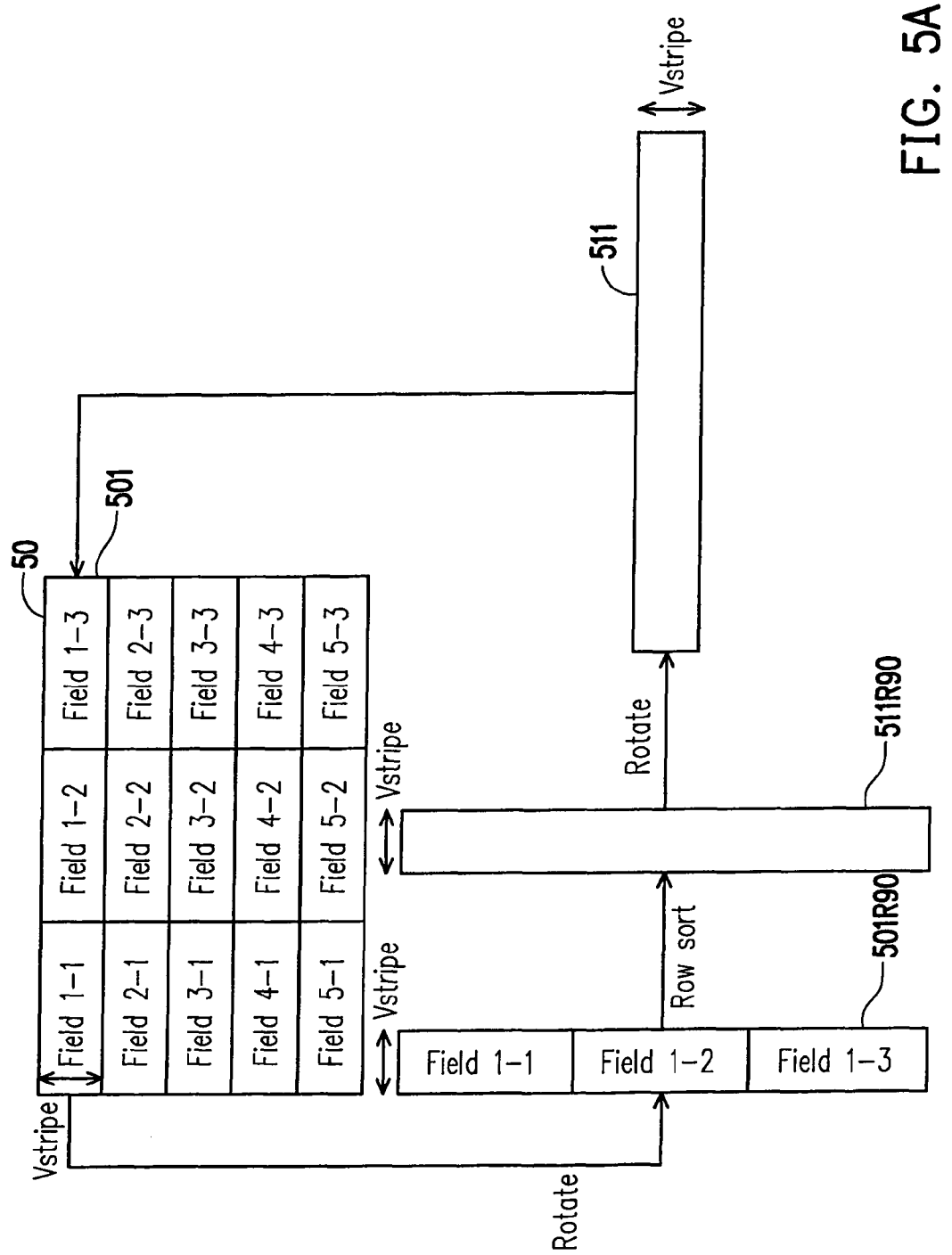
FIG. 5A illustrates a method for sorting horizontal fields in a frame data according to an embodiment of the present invention.
Figure 5B:
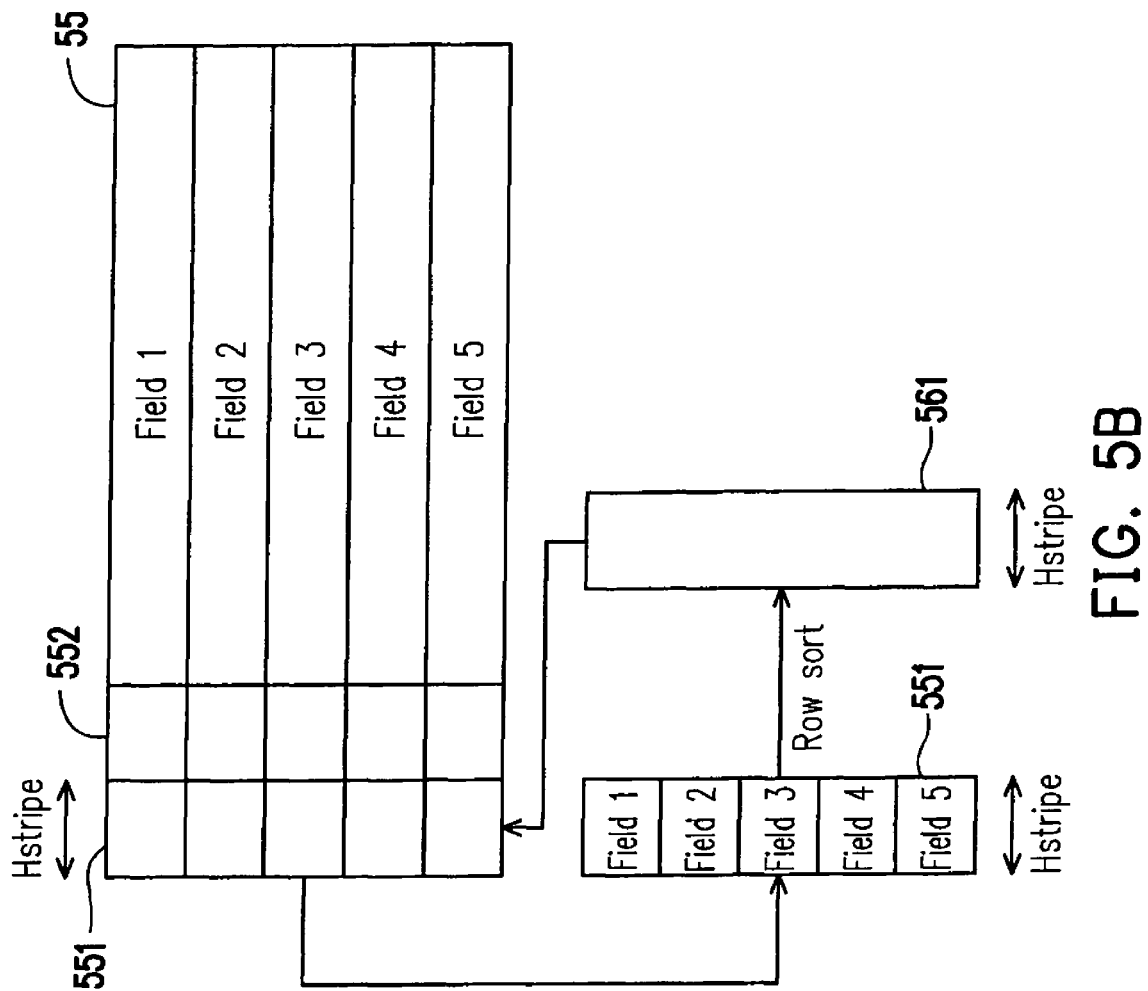
FIG. 5B illustrates a method for sorting vertical fields in a frame data according to an embodiment of the present invention.

The present invention provides a method and an apparatus for sorting a raw data with horizontal division. FIG. 5A illustrates how to sort horizontal fields in the raw data according to the method provided by an embodiment of the present invention, and FIG. 5B illustrates how to sort vertical fields in the raw data according to the method provided by an embodiment of the present invention. According to the embodiment of the present invention, a horizontal field sorting operation is first performed to a frame data 50 to obtain a frame data 55, and then a vertical field sorting operation is performed to the frame data 55.

Referring to FIG. 5A, the frame data 50 has five vertical fields, wherein the $i^{th}$ vertical field further has horizontal fields Field i-1~Field i-3. According to the sorting method provided by an embodiment of the present invention, each time at least one data block of Vstripe rows is read and rotated 90°, and a row sorting is then performed to the data block of the Vstripe rows according to the number of the horizontal fields. After that, the sorted data block of the Vstripe rows is rotated 90° and used for overwriting the previously-read data block of the Vstripe rows. In the present embodiment, the value of Vstripe is the same as the row number of the horizontal fields Field i-1~Field i-3. However, the value of Vstripe may also be different from the row number of the horizontal fields Field i-1~Field i-3; instead, the value of Vstripe may be determined according to the size of the buffer memory.

Referring to FIG. 5A, the data block 501 of Vstripe rows is read and rotated 90° so as to produce data block 501R90. After that, a row sorting is performed to the data block 501R90 according to the number of the horizontal fields so as to produce data block 511R90. Next, the data block 511R90 is rotated 90° so as to produce data block 511, and the data block 511 are used for overwriting the previously-read data block 501. FIG. 5A illustrates the first horizontal field sorting operation performed to the frame data 50, and similarly, horizontal field sorting operation is sequentially performed to the other rows of the frame data 50 until each row of the frame data 50 has been sorted and a frame data 55 as shown in FIG. 5B is produced.

Referring to FIG. 5B, after the horizontal field sorting operation process is completed, a vertical field sorting operation is performed to the frame data 55. According to the sorting method provided by the embodiment of the present invention, each time at least one data block of Hstripe columns is read and a row sorting is performed to the data block of the Hstripe columns according to the number of the vertical fields. After that, the sorted data block of the Hstripe columns used for overwriting the previously-read data block of the Hstripe columns. In the present embodiment, the value of Hstripe can be determined according to the size of the buffer memory.

As shown in FIG. 5B, Hstripe columns of data block 551 is read, and a row sorting is performed to these data block 551 according to the number of the vertical fields so as to produce data block 561. After that, the data block 561 is used for overwriting the previously-read data block 551. FIG. 5B illustrates the first vertical field sorting operation performed to the frame data 55, and similarly, the vertical field sorting operation is sequentially performed to other columns of the frame data 55 until each column of the frame data 55 has been sorted and the frame data 55 is sorted into a format acceptable to a display apparatus.

Assuming that the frame data 50 has 10*6 pixels and the value of Vstripe is 2, according to the present invention, the first two rows of data block 501 is first read and rotated 90° so as to produce data block 501R90. Next, a row sorting is performed to the data block 501R90. Because the number of the horizontal fields is 3, during the sorting process, the $1^{st}$ and the $6^{th}$ row of the data block 501R90 remain unchanged, the $2^{nd}$ row becomes the $4^{th}$ row, the $3^{rd}$ row becomes the $2^{nd}$ row, the $4^{th}$ row becomes the $5^{th}$ row, and the $5^{th}$ row becomes the $3^{rd}$ row. After that, the sorted data block 511R90 is rotated 90° so as to produce data block 511, and the data block 511 is used for overwriting the previously-read data block 501.

Foregoing sorting process is repeated until each row of the frame data 50 is sorted, so as to produce a frame data 55. It should be noted here that horizontal field sorting operation has been performed to the frame data 55 so that the data in each vertical field Field1-Field5 has been sorted into simple row data (not like in the original frame data 50 wherein each row of data is arranged randomly). In other words, the frame data 55 can be sorted into a format acceptable to a display apparatus by only performing foregoing vertical field sorting operation to the frame data 55.

In the present embodiment, while performing the vertical field sorting operation, the data block 551 of the first two columns of the frame data 55 is first read. Next, the data block 551 is sorted according to the number of the vertical fields, wherein the $1^{st}$ and the $10^{th}$ row remain unchanged, the $2^{nd}$ row becomes the $6^{th}$ row, the third row becomes the $2^{nd}$ row, the $4^{th}$ row becomes the $7^{th}$ row, the $5^{th}$ row becomes the $3^{rd}$ row, the $6^{th}$ row becomes the $8^{th}$ row, the $7^{th}$ row becomes the $4^{th}$ row, the $8^{th}$ row becomes the $9^{th}$ row, and the $9^{th}$ row becomes the $5^{th}$ row. After that, the sorted data block 561 is used for overwriting the data block 551. Foregoing sorting process is repeated until each column of the frame data 55 is sorted so as to complete the sorting of the entire frame data 50.

Based on the method illustrated in FIG. 5A and FIG. 5B, an apparatus for sorting a frame data with horizontal division can be implemented with existing hardware structure. The device for performing row sorting is the same as a device for performing vertical field sorting operation in the conventional technique, and a rotating apparatus is usually disposed in a conventional digital video camera or digital camera. Thus, the apparatus for sorting a frame data with horizontal division provided by the present invention can be implemented by revising the existing hardware structure.

It should be noted here that because the existing structure can only perform row sorting (vertical field sorting operation), the horizontal field sorting operation in foregoing embodiment is accomplished by performing rotation and row sort, so that the horizontal field sorting operation can be accomplished without any additional hardware device. However, the present invention is not limited to the method described above, and a device having horizontal field sorting operation function may also be adopted without departing the scope and spirit of the present invention.

Additionally, even though the horizontal field sorting operation is performed before the vertical field sorting operation in the embodiment described above, the present invention is not limited to such a sequence. In an actual application, the vertical field sorting operation may also be performed before the horizontal field sorting operation.

Figure 6A:
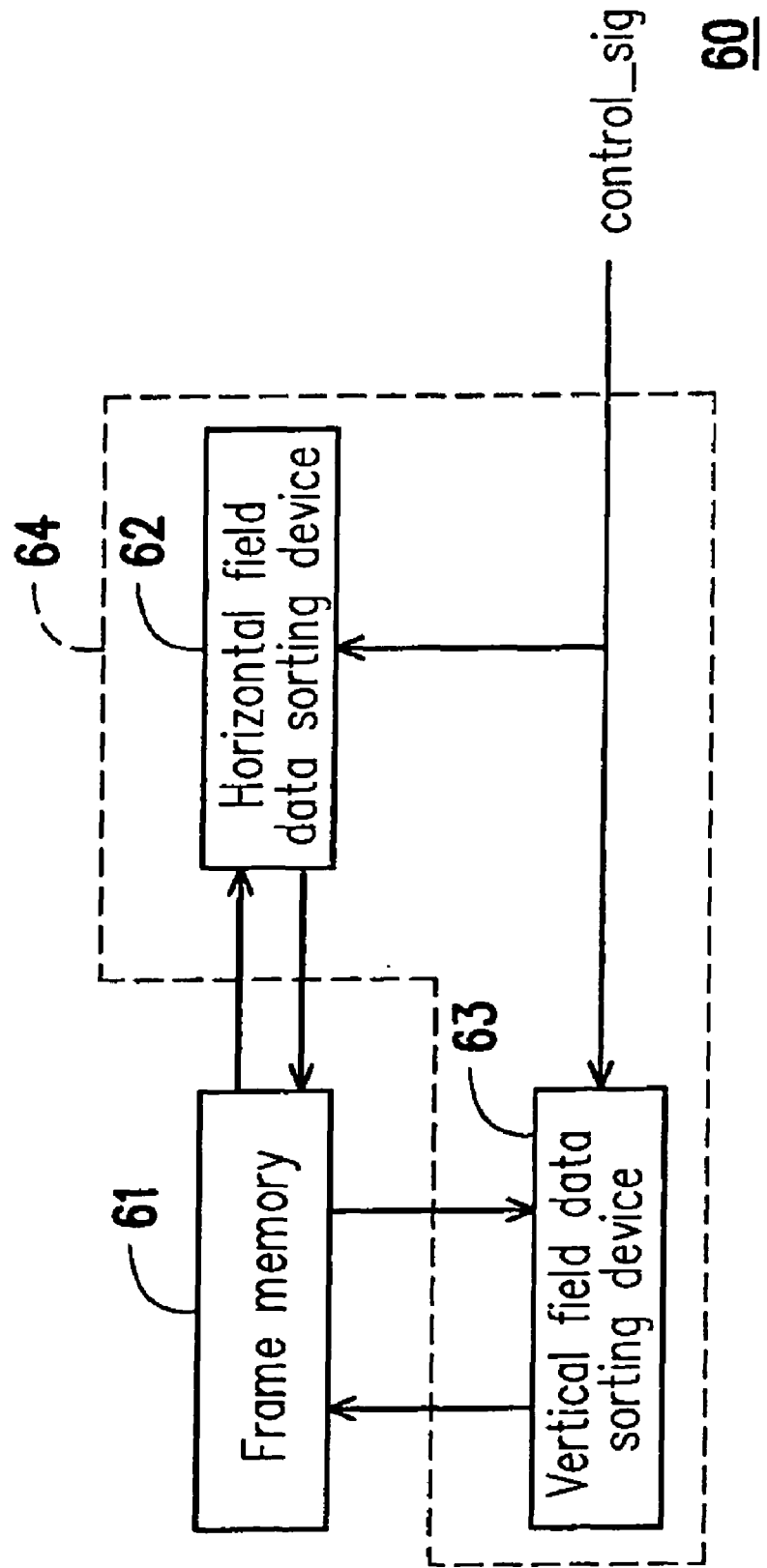
FIG. 6A is a circuit diagram of an apparatus for sorting a frame data with horizontal division according to an embodiment of the present invention.

FIG. 6A is a circuit diagram of an apparatus for sorting a frame data with horizontal division according to an embodiment of the present invention. As shown in FIG. 6A, the sorting apparatus 60 includes a frame memory 61 and a frame data sorting device 64. The frame data sorting device 64 is coupled to the frame memory 61, and the frame data sorting device 64 includes a horizontal field data sorting device 62 and a vertical field data sorting device 63. The horizontal field data sorting device 62 and the vertical field data sorting device 63 are controlled by a control signal control_sig. When the control signal control_sig controls the horizontal field data sorting device 62 to operate, the horizontal field data sorting device 62 reads a data block of Vstripe rows of the frame data from the frame memory 61 and rotates the data block of the Vstripe rows 90° to generate a rotated data block of the Vstripe rows. Then the horizontal field data sorting device 62 performs a row sorting to the rotated data block of the Vstripe rows according to the number of the horizontal fields to generate a rotated and sorted data block of the Vstripe rows. Next, the horizontal field data sorting device 62 rotates the rotated and sorted data block of the Vstripe rows 90° to generate a sorted data block of the Vstripe rows and uses it to overwrite the originally-read data block of the Vstripe rows. After each row of the frame data has been sorted, the control signal control_sig controls the vertical field data sorting device 63 to operate. The vertical field data sorting device 63 reads a data block of Hstripe columns of the frame data from the frame memory 61 and then performs a row sorting to the data block of the Hstripe columns according to the number of the vertical fields to generate a sorted data block of the Hstripe columns. After that, the vertical field data sorting device 63 uses the sorted data block of the Hstripe columns to overwrite the previously-read data block of the Hstripe columns. The vertical field data sorting device 63 repeats foregoing steps until each column of the frame data in the frame memory 61 has been sorted. By now, the sorting of the entire frame data is completed.

Figure 6B:
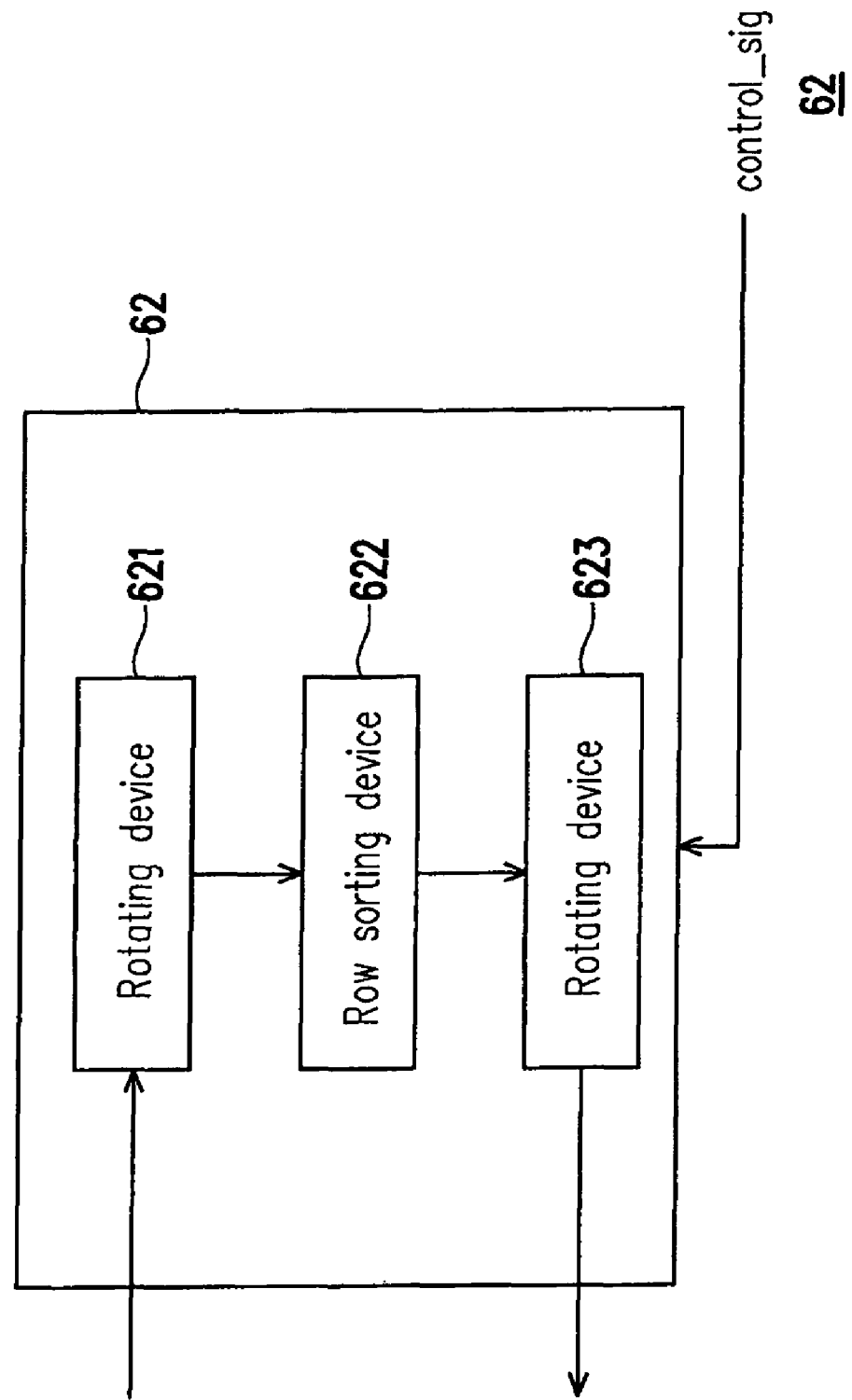
FIG. 6B is a circuit diagram of a horizontal field data sorting device 62 according to an embodiment of the present invention.

FIG. 6B is a circuit diagram of the horizontal field data sorting device 62 according to an embodiment of the present invention. The horizontal field data sorting device 62 includes a rotating device 621, a rotating device 623, and a row sorting device 622. The row sorting device 622 is coupled to the rotating devices 621 and 623. The rotating device 621 rotates a data block of the Vstripe rows read from the frame memory, wherein the data block of the Vstripe rows is rotated 90°. The row sorting device 622 performs a row sorting to the rotated data block of the Vstripe rows according to the number of the horizontal fields. The rotating device 623 rotates the rotated and sorted data block of the Vstripe rows, wherein the rotated and sorted data block of the Vstripe rows is rotated 90°.

The embodiment illustrated in FIG. 6A and FIG. 6B is only used for describing the concept of the present invention but not for limiting the scope thereof. Those skilled in the art should be able to combine the two rotating devices into one rotating device by adopting a control signal. However, the embodiment illustrated in FIG. 6A and FIG. 6B is also within the scope of the present invention.

Figure 6C:
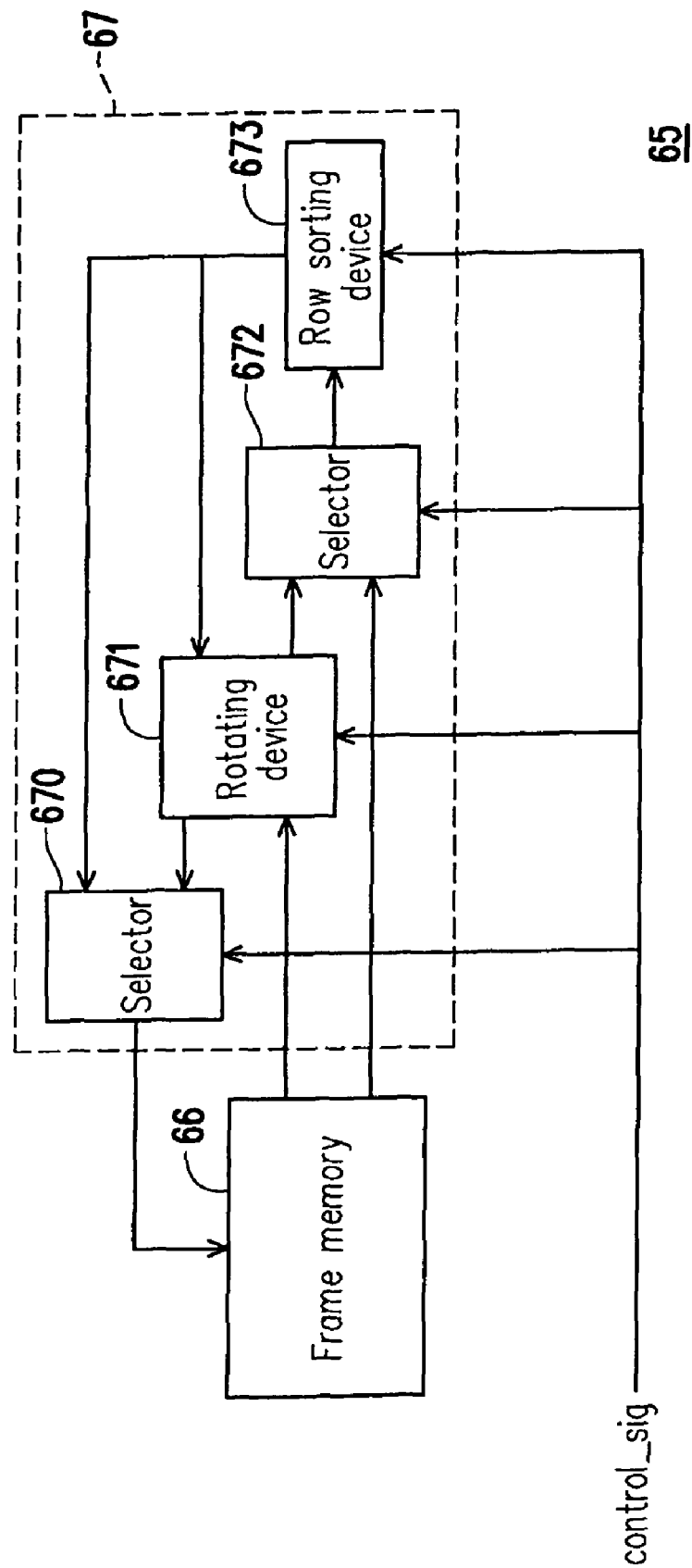
FIG. 6C is a circuit diagram of an apparatus for sorting a frame data with horizontal division according to another embodiment of the present invention.

FIG. 6C is a circuit diagram of an apparatus for sorting a frame data with horizontal division according to another embodiment of the present invention. The sorting apparatus 65 includes a frame memory 66 and a frame data sorting device 67 coupled to the frame memory 66. The frame data sorting device 67 is controlled by a control signal control_sig and includes a selector 670, a selector 672, a rotating device 671, and a row sorting device 673. The selector 670 is coupled to the rotating device 671, the rotating device 671 is coupled to the selector 672, the selector 672 is coupled to the row sorting device 673, and the row sorting device is coupled to the selector 670.

First, the control signal control_sig controls the rotating apparatus to sequentially read a data block of Vstripe rows from the frame memory 66 and rotate the data block of the Vstripe rows 90° to generate a rotated data block of the Vstripe rows. The rotated data block of the Vstripe rows is then sent to the row sorting device 673 via the selector 672.

The row sorting device 673 performs a row sorting to the data block of the Vstripe rows output by the selector 672 according to the number of the horizontal fields to generate a rotated and sorted data block of the Vstripe rows and sends the rotated and sorted data block of the Vstripe rows to the rotating device 671. The rotating device 671 rotates the rotated and sorted data block of the Vstripe rows 90° to generate a sorted data block of the Vstripe rows, and the sorted data block of the Vstripe rows is sent to the frame memory 66 via the selector 670. Finally, the data block of the Vstripe rows output by the selector 670 is used for overwriting the previous read data block of the Vstripe rows.

After the horizontal field sorting operation is performed to each row of the frame data in the frame memory, the control signal control_sig controls the rotating apparatus to stop operating. The selector 672 reads a data block of Hstripe columns from the frame memory and sends the data block of the Hstripe columns to the row sorting device 673. The row sorting device 673 performs a row sorting to the data block of the Hstripe columns according to the number of the vertical fields to generate a sorted data block of the Hstripe columns and then sends the sorted data block of the Hstripe columns to the frame memory 66 via the selector 670 for overwriting the previously-read data block of the Hstripe columns. The sorting of the entire frame data in the frame memory 66 is completed after the vertical field sorting operation is performed to each column of the frame data in the frame memory 66.

Figure 7A:
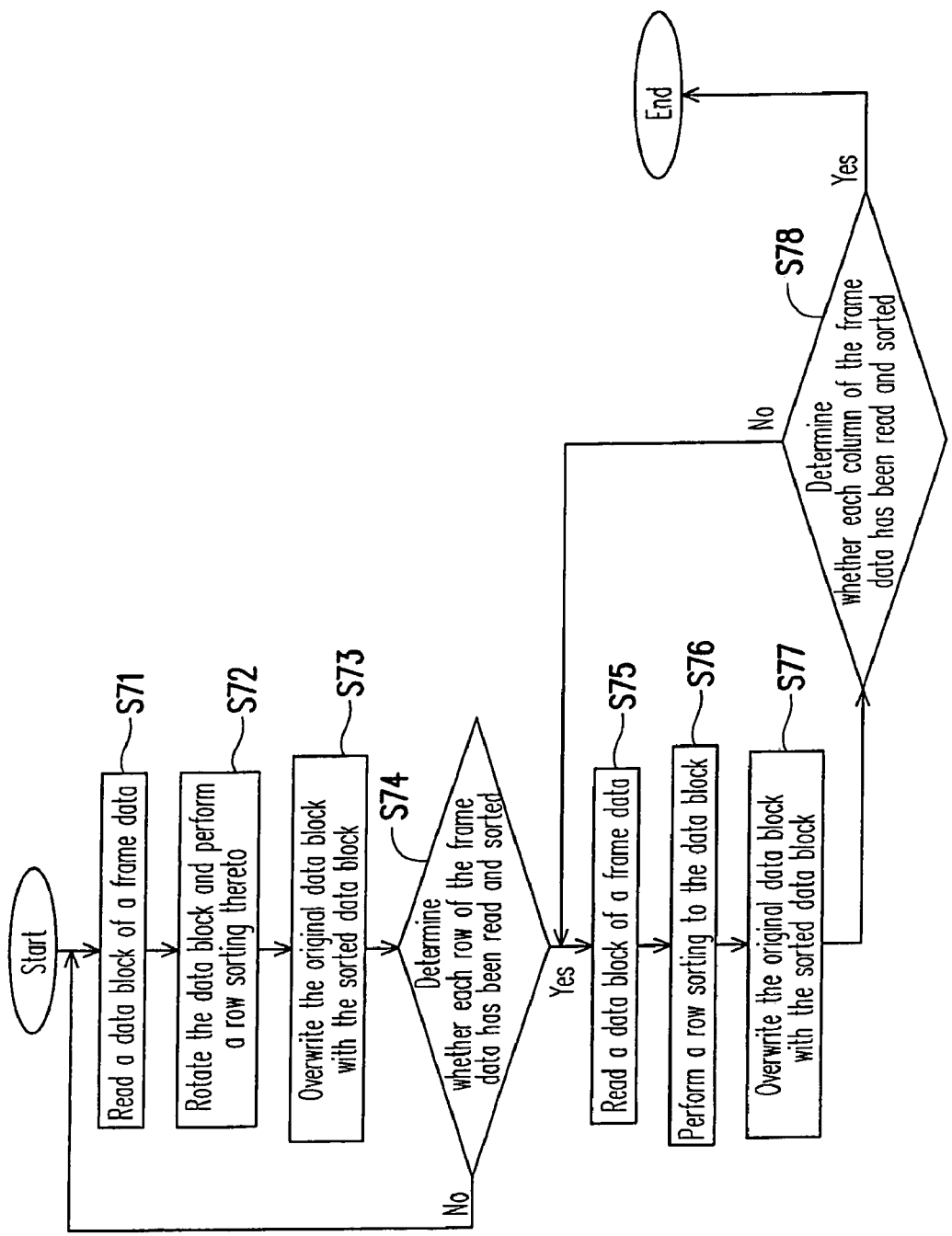
FIG. 7A is a flowchart of a method for sorting a raw data with horizontal division according to an embodiment of the present invention.

FIG. 7A is a flowchart of a method for sorting a frame data with horizontal division according to the present invention. First, in step S71, a data block of Vstripe rows of the frame data is read. Then, in step S72, the data block of the Vstripe rows is rotated 90° to generate a rotated data block of the Vstripe rows, and a row sorting operation is performed to the rotated data block of the Vstripe rows according to the number of the horizontal fields to generate a rotated and sorted data block of the Vstripe rows before the rotated and sorted data block of the Vstripe rows is rotated 90° again to generate the sorted data block of the Vstripe rows. Next, in step S73, the sorted data block of the Vstripe rows is used for overwriting the previously-read data block of the Vstripe rows. Thereafter, in step S74, whether each row of the frame data has been read and sorted is determined. If there is still unsorted row of the frame data, the process returns to step S71 to process the data block of the next Vstripe rows; otherwise, the process goes to step S75, wherein a data block of Hstripe columns is read from the frame data. Next, in step S76, a row sorting is performed to the data block of the Hstripe columns according to the number of the vertical fields to generate a sorted data block of the Hstripe columns. In step S77, the sorted data block of the Hstripe columns is used for overwriting the previously-read data block of the Hstripe columns. After that, in step S78, whether each column of the frame data has been read and sorted is determined. If there is still unsorted column of the frame data, the process returns to step S75 to process the data block of the next Hstripe columns; otherwise, the sorting of the entire frame data has been completed and the sorted frame data is sent to a display apparatus to be displayed.

Figure 7B:
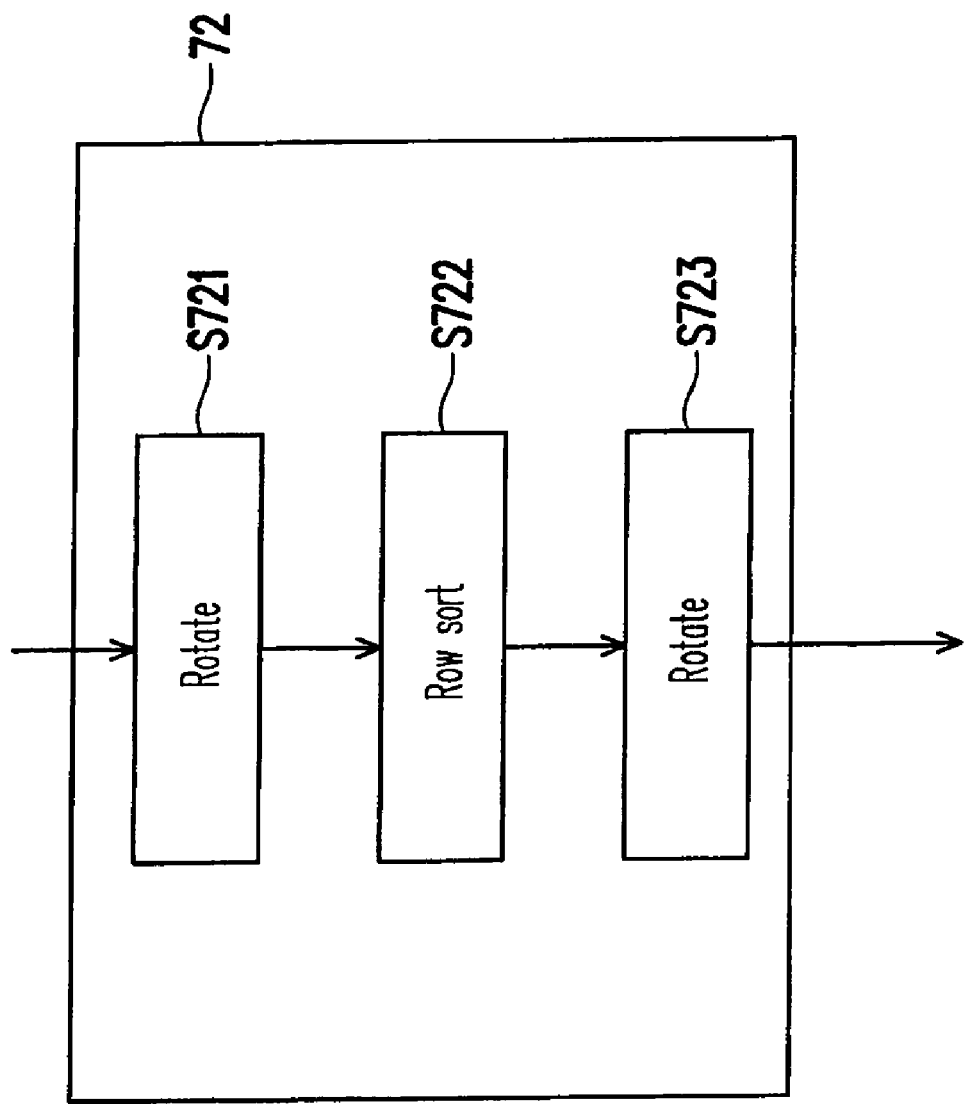
FIG. 7B is a detailed flowchart of step S72 in FIG. 7A.

FIG. 7B is a detailed flowchart of foregoing step S72. In step S721, the data block of the Vstripe rows is rotated 90°. After that, in step S722, a row sorting is performed to the rotated data block of the Hstripe columns according to the number of the horizontal fields. Finally, in step S723, the rotated and sorted data block of the Hstripe columns sorted in step S722 is rotated 90°.

Figure 8:
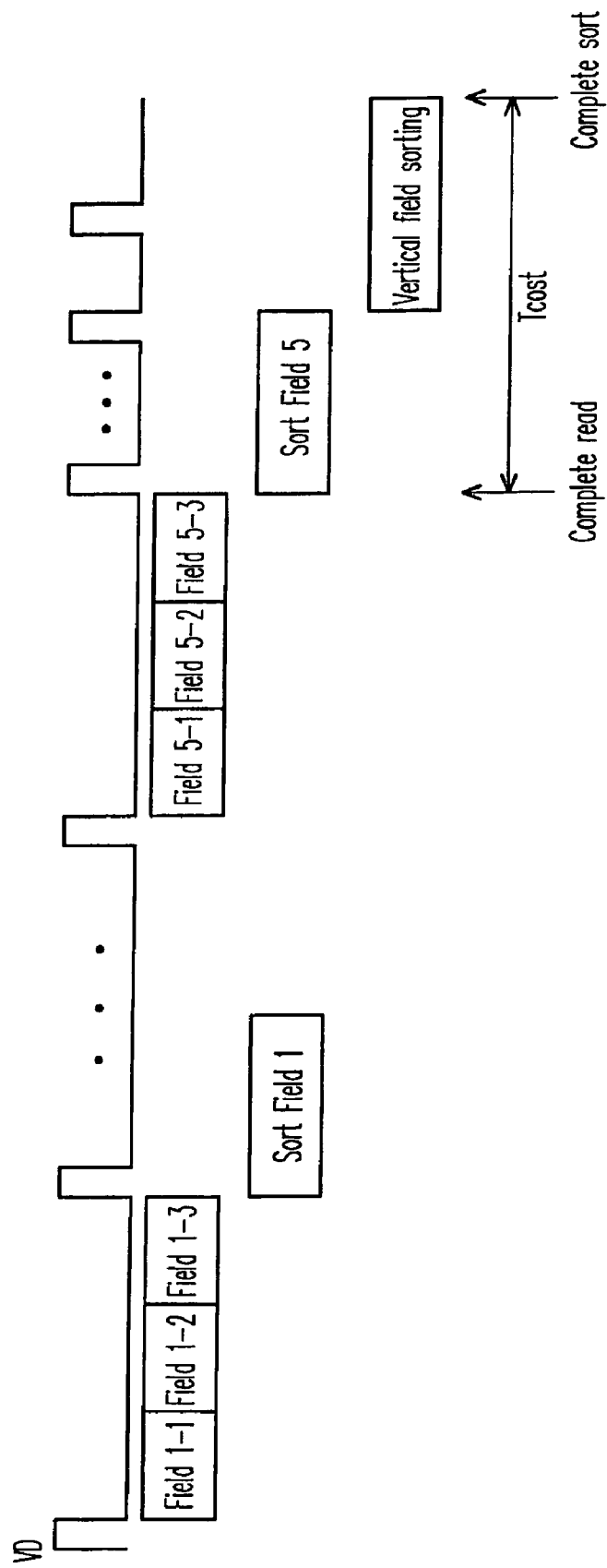
FIG. 8 illustrates the timing of a method or an apparatus for sorting a raw data with horizontal division according to an embodiment of the present invention.

FIG. 8 illustrates the timing of a sorting process by using the method and apparatus provided by the present invention.

Figure 4:
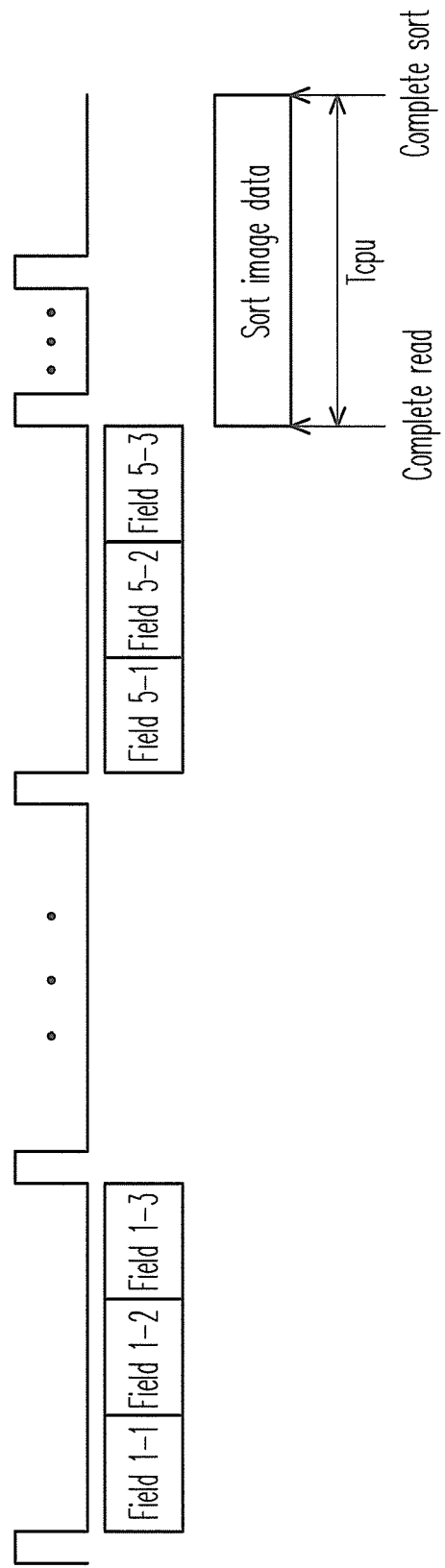
FIG. 4 illustrates a method for sorting an image data 30 with horizontal division through CPU calculations and the timing thereof.

In the present embodiment, the value of Vstripe is equal to the row number of the horizontal fields. However, the present embodiment is only used for the convenience of description but not for limiting the scope of the present invention. When a vertical synchronous signal VD drops from a high level to a lower level, the data block of the Vstripe rows is read, that is, the data block of the Vstripe rows of the horizontal fields Field 1-1~Field 1-3 is read in the present embodiment. After that, while reading the data block of the Vstripe rows of the horizontal fields Field 2-1~Field 2-3, the Field 1 (i.e. the horizontal fields Field 1-1~Field 1-3) are rotated and row-sorted (as in steps S71~S73). After each row of the frame data is sorted, a vertical field sorting operation is then sequentially performed to the row-sorted frame data (as in steps S75~S77), so as to complete the sorting of the entire frame data. The time Tcost required for sorting the frame data includes a horizontal field sorting operation time and a plurality of vertical field sorting operation time, and which is less than the time Tcpu required for sorting the frame data through CPU calculations (as shown in FIG. 4).

In overview, the method and apparatus provided by the present invention for sorting a frame data with horizontal division can be implemented by revising the existing hardware structure, and the time required for sorting a frame data is less that that required in the conventional technique. Moreover, some devices can be combined by adopting a control signal so that the space taken by the hardware can be reduced. Furthermore, the values of Vstripe and Hstripe can be determined according to the size of the buffer memory, and within an acceptable processing time range, the values of Vstripe and Hstripe can be set to lower values so as to save the memory space.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for sorting a raw data with horizontal division, the apparatus comprising:
   a frame memory, for storing a frame data having m vertical fields, wherein each of the vertical fields has n horizontal fields, and m and n are integers with a value of at least two; and
   a frame data sorting device, coupled to the frame memory, the frame data sorting device sorting at least one first data block having a first number of rows of the frame data according to the value n to generate a sorted first data block and overwriting the first data block with the sorted first data block, and the frame data sorting device, also sorting at least one second data block having a second number of columns of the frame data according to the value m to generate a sorted second data block and overwriting the second data block with the sorted second data block, after sorting the at least one first data block having the first number of rows of the frame data according to the value n to generate the sorted first data block and overwriting the first data block with the sorted first data block, wherein the frame data sorting device comprises:
      a first sorting device, for reading the first data block from the frame memory, rotating and sorting the first data block according to the value n, and then rotating the first data block, and sending the sorted first data block to the frame memory for overwriting the first data block.

2. The apparatus according to claim 1, wherein the frame data sorting device sorts the second data block according to the value m only after each row of the frame data is sorted and overwritten.

3. The apparatus according to claim 1, wherein the frame data sorting device sorts the first data block according to the value n only after each column of the frame data is sorted and overwritten.

4. The apparatus according to claim 1, wherein the frame data sorting device further comprises:
   a second sorting device, for reading the second data block from the frame memory, sorting the second data block according to the value m, and sending the sorted second data block to the frame memory for overwriting the second data block.

5. The apparatus according to claim 4, wherein when the frame data sorting device sorts the first data block and the second data block is controlled by a control signal.

6. The apparatus according to claim 5, wherein the first sorting device comprises:
   a first rotating device, for reading the first data block and rotating the first data block 90° to generate a rotated first data block;
   a row sorting device, coupled to the first rotating device, the row sorting device performing a row sorting to the rotated first data block according to the value n to generate a rotated and sorted first data block; and
   a second rotating device, coupled to the row sorting device, the second rotating device rotating the rotated and sorted first data block 90° to generate the sorted first data block and sending the sorted first data block to the frame memory for overwriting the first data block.

7. The apparatus according to claim 1, wherein the frame data sorting device comprises:
   a first selector, controlled by a control signal;
   a second selector, controlled by the control signal;
   a rotating device, coupled to the first selector and the second selector, controlled by the control signal, the rotating device rotating the first data block 90° to generate a rotated first data block; and
   a row sorting device, coupled to the first selector and the second selector, controlled by the control signal;
   wherein the first selector selects the second data block or the rotated first data block according to the control signal; the row sorting device performs a row sorting to the rotated first data block based on the value n to generate a rotated and sorted first data block or to the second data block based on the value m to generate the sorted second data according to the control signal; the rotating device rotates the rotated and sorted first data block 90° to generate the sorted first data block according to the control signal; and the second selector selects the sorted second data block or the sorted first data block according to the control signal.

8. A method for sorting a raw data with horizontal division, the method comprising:
   reading a first data block having a plurality of rows of a frame data, wherein the frame data has m vertical fields, and each of the vertical fields has n horizontal fields;
   sorting the first data block according to the value n to generate a sorted first data block, wherein the step of sorting the first data block according to the value n comprises:

(a) rotating the first data block to generate a rotated first data block;
(b) performing a row sorting to the rotated first data block according to the value n to generate a rotated and sorted first data block; and
(c) rotating the rotated and sorted first data block to generate the sorted first data format;

overwriting the first data block in the frame data with the sorted first data block;

reading a second data block having a plurality of columns of the frame data;

sorting the second data block according to the value m to generate a sorted second data block; and overwriting the second data block in the frame data with the sorted second data block.

9. The method according to claim 8, wherein
in the step of rotating the first data block to generate the rotated first data block, the first data block is rotated 90°; and
in the step of rotating the rotated and sorted first data block to generate the sorted first data format, the sorted first data block is rotated 90°.

10. The method according to claim 8, wherein the second data block is read and sorted only after each row in the frame data is sorted and overwritten.

11. The method according to claim 8, wherein the first data block is read and sorted only after each column in the frame data is sorted and overwritten.

* * * * *